Sept. 12, 1950  E. D. WILKERSON  2,522,324
CALKING MATERIAL DISPENSER
Filed Feb. 19, 1948
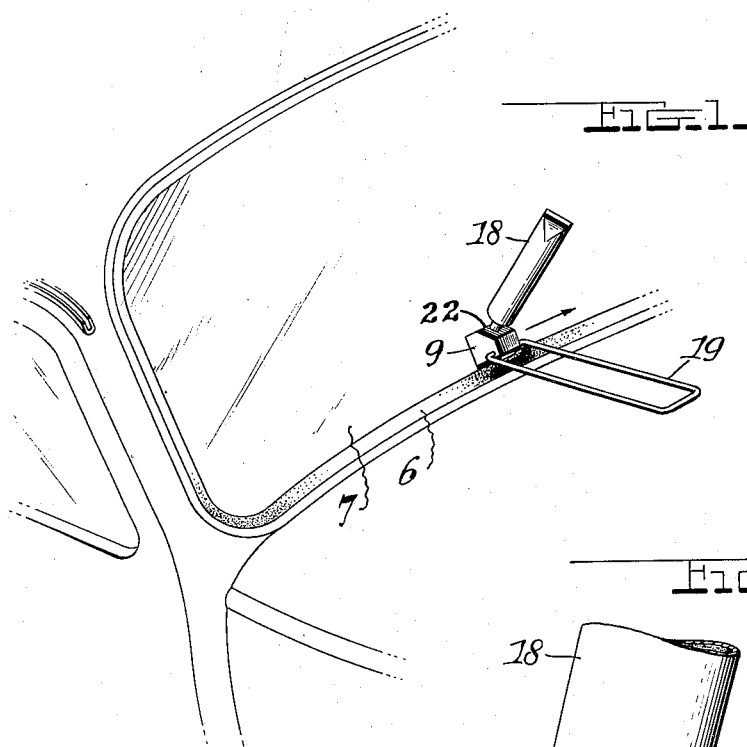
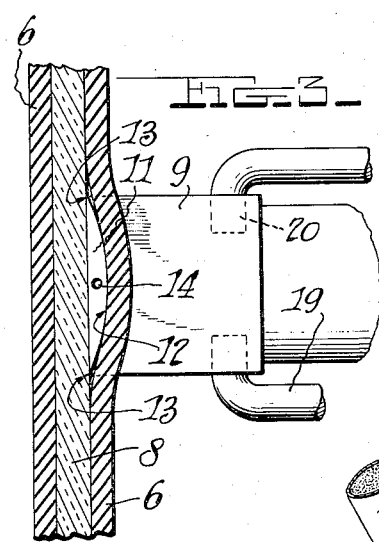
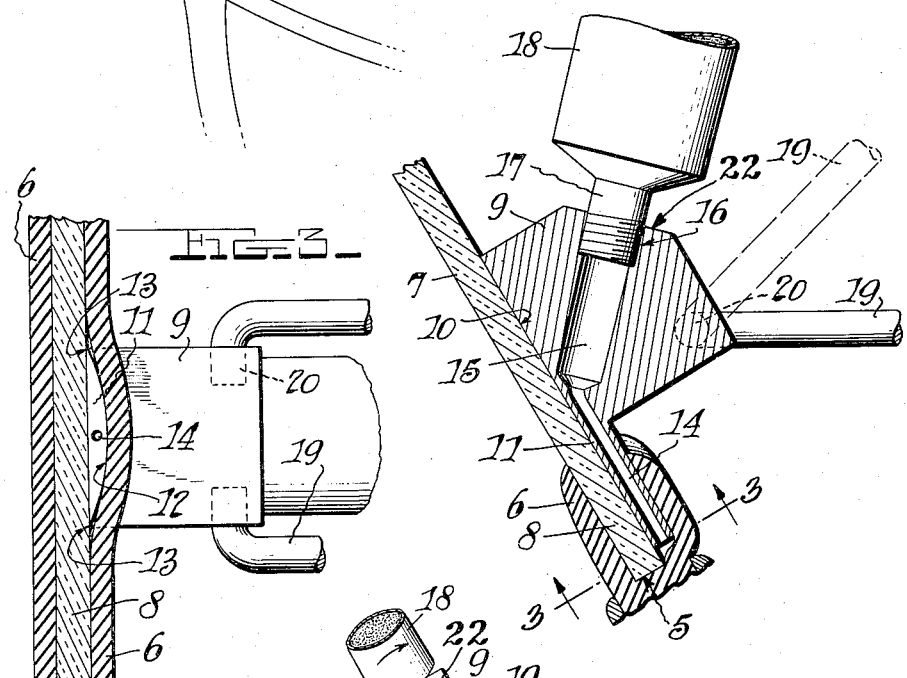
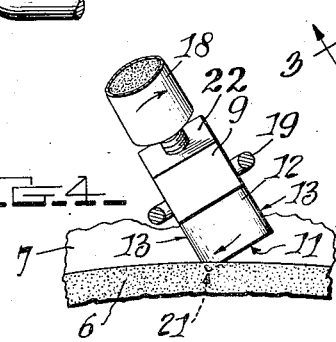
INVENTOR.
Edward D. Wilkerson
BY
Mason, Porter, Diller & Stewart
attys.

Patented Sept. 12, 1950

2,522,324

UNITED STATES PATENT OFFICE 2,522,324

CALKING MATERIAL DISPENSER

Edward D. Wilkerson, Orange, N. J.

Application February 19, 1948, Serial No. 9,579

5 Claims. (Cl. 18—3.5)

The invention relates generally to devices adapted for the dispensing of fluid or semi-fluid materials of which sealing cement comprises an example, and it primarily seeks to provide a novel dispensing device capable of being efficiently and conveniently used in the application by extrusion of a suitable sealing material between a yieldable gasket and a glass or other surface against which the gasket engages in sealing contact.

While it is subject to more general usage, the invention is particularly adaptable for use in extruding a suitable sealing material into the groove of a supporting or sealing gasket of rubber or like yieldable material in which edge portions of glass panes such as automobile windshields or the like are received, thereby to provide a union between the gasket and glass effective to prevent ingress of moisture into the gasket groove and, perhaps, into the laminae of which the windshield may be formed. It is an object of the present invention to provide a novel and inexpensively manufactured dispensing device of the character stated and including a nozzle portion readily insertable between opposing glass and gasket surface portions for efficiently placing a suitable sealing material therebetween, said material being extruded through said nozzle portion.

In its more detailed nature the invention resides in providing a novel sealing material dispensing device including a block-like body having a flat face placeable against the glass to be sealed, and a nozzle portion extending from the body and having a flat face forming a planar extension of said body face, said nozzle portion being narrow in cross section and having the face thereof opposite the flat face smoothly curved to provide sharp side edges, thereby to facilitate insertion of the nozzle between a glass edge portion and an opposing yieldable gasket portion, suitable supporting handle means being provided, and there being included a suitable extruding duct extending through the nozzle portion and through which the sealing material may be extruded by pressure applied to a collapsible tube carried by the body and having its outlet connected with said duct.

Another object of the invention is to provide a device of the character stated in which there is included a handle which is pivotally attached to the body in a manner enabling the holding of the same at various angles during the application of the sealing material.

With the above and other objects in view that will hereinafter appear, the nature of the invention will be more clearly understood by reference to the following detailed description, the appended claims, and the several views illustrated in the accompanying drawing.

In the drawing:

Figure 1 is a perspective view illustrating the improved caulking material dispensing device in use.

Figure 2 is a fragmentary vertical cross section illustrating the dispensing device in position for applying a sealing material between a windshield and the contacting sealing gasket.

Figure 3 is a detail horizontal section taken on the line 3—3 on Figure 2.

Figure 4 is a fragmentary face view and part vertical section illustrating the manner of inserting the dispensing nozzle between a pane or other surface and a contacting yieldable sealing member.

In the example of embodiment of the invention herein disclosed, the invention is illustrated in use in the extrusion of a sealing material into the groove 5 in the gasket or mounting strip 6 in which a windshield 7 has its edge portion 8 enclosed.

The dispenser includes a block-like body 9 having a flat face 10 which is placeable against the windshield 7 as in Figures 1 and 2, and said flat face extends into a like face provided on a thin nozzle 11 extended from the block-like body in the manner clearly illustrated in Figures 2 and 4. The face of the thin nozzle extension 11 opposite the flat face 10 which is placeable against the windshield or other surface to be sealed is smoothly curved as at 12 to present sharp lateral edges 13 which provide entering wedges in the manner clearly illustrated in Figure 3.

An extruding duct 14 extends through the central end portion of the nozzle extension 11 and opens at its inner end into a chamber or bore 15 formed in the block 9 in the manner best illustrated in Figure 2. The chamber is tapped at its outer end as at 16 to receive the externally threaded outlet neck or discharge throat 17 of a collapsible dispensing tube 18 of the well known so-called paint tube type and from which the sealing material may be dispensed through said discharge throat 17, the chamber 15 and duct 14 by a suitable squeezing of the tube 18.

It will be apparent that the dispensing tube 18 constitutes a reservoir which projects as a hand hold means from the angled face of the block 9 and which is deformable to bring about displacement of caulking material from the reservoir 18 and through the throat 17, the chamber 15 and the nozzle duct 14.

A bail or handle 19 is pivoted as at 20 to the block and may be gripped and extended in any angular relation to the block as indicated in Figure 1 and in dotted lines in Figure 2 to facilitate the manipulation of the dispenser.

In the use of the improved dispensing device 10 the flat face 10 of the block and its nozzle extension 11 is placed against the pane or other surface to be sealed, and then one or the other of the two wedge points 21 formed by the smooth curving of the face 12 of the nozzle extension is inserted between the pane and the gasket in the manner illustrated in Figure 4, and after the nozzle extension has been worked down into the groove 5 in the manner clearly illustrated in Figure 2 the device may be moved along in the groove in the manner indicated by the arrow in Figure 1, pressure being applied to the collapsible tube 18 for dispensing sealing material into the space between the gasket and the pane while the dispenser is being moved.

By forming the block face 22 in angular relation to the flat face 10 of said block and its nozzle extension 11 and threading the tube neck or discharge throat 17 into the block with its axis in perpendicular relation to said face 22, the use of the tube or reservoir 18 as hand hold means in conjunction with the handle 19 is facilitated, as will be apparent by reference to Figure 1.

The herein disclosed dispensing device is simple in construction and by its use in the manner illustrated and described, it is possible to very effectively place the sealing material well down in the groove between a windshield or the like and its sealing gasket 6 so as to provide the desired moisture extruding union between the glass and the gasket.

While one form of the invention has been shown for purposes of illustration, it is to be clearly understood that various changes in the details of construction and arrangement of parts may be made without departing from the spirit and scope of the invention as defined in the appended claims.

I claim:

1. A dispenser of the character described comprising a body block having a very thin nozzle extension including an end portion readily insertable and movable laterally between a glass pane or equivalent surface and an engaging face of a sealing gasket of yieldable material, a chamber in said block, said block also having provision for removably mounting a dispensing tube including a discharge throat for communicating with said chamber, a dispensing duct leading from said chamber through the extreme end of said nozzle end portion, and means for holding the nozzle flat against the pane and moving the same therealong while a sealing material is being extruded from the tube and through said chamber and duct into the space between said pane and gasket.

2. A dispenser as defined in claim 1 in which the nozzle extension and block are shaped to present a co-planar face for contact with the pane to be sealed, the face of said extension away from said plane face being smoothly rounded to terminate laterally in sharp edge portions readily insertable between a glass pane and a contacting gasket surface.

3. A dispenser as defined in claim 1 in which the holding means comprises a bail-like handle pivotally attached to the block so that it can be firmly and conveniently grasped in various angular positions with relation to the body block incidental to the dispensing of sealing material from the nozzle extension.

4. A dispenser as defined in claim 1 in which the nozzle extension and block are shaped to present a co-planar face for contact with the pane to be sealed, the face of said extension away from said plane face being smoothly rounded to terminate laterally in sharp edge portions readily insertable between a glass pane and a contacting gasket surface, and in which the holding means comprises a bail-like handle pivotally attached to the block so that it can be firmly and conveniently grasped in various angular positions with relation to the body block incidental to the dispensing of sealing material from the nozzle extension.

5. A dispenser for caulking material comprising a body block having a very thin nozzle extension including an end portion readily insertable and movable laterally between a glass pane or equivalent surface and an engaging face of a sealing gasket of yieldable material, said nozzle including a flat face for lying flat against said pane, said block having a chamber therein and also a face portion bearing angular relation to said flat face, a reservoir mounted on the block and projecting as a hand hold means from said face portion and having a discharge throat for communicating with said chamber, a dispensing duct leading from said chamber through said nozzle end portion, said reservoir being deformable to bring about displacement of caulking material from the reservoir and through said throat said chamber and said duct, and a handle projecting from the block and effective in cooperation with said reservoir hand hold means for holding the nozzle against the pane and moving the same therealong while a caulking material is being extruded from the tube and through said throat, said chamber and said duct into the space between said pane and gasket.

EDWARD D. WILKERSON.

REFERENCES CITED

The following references are of record in the file of this patent:

UNITED STATES PATENTS

| Number | Name | Date |
|---|---|---|
| 861,802 | Brown | July 30, 1907 |
| 1,929,306 | Carson | Oct. 3, 1933 |
| 2,363,023 | Stewart | Nov. 21, 1944 |